(No Model.)
W. C. PITNER.
TWO WHEELED VEHICLE.
No. 317,413. Patented May 5, 1885.
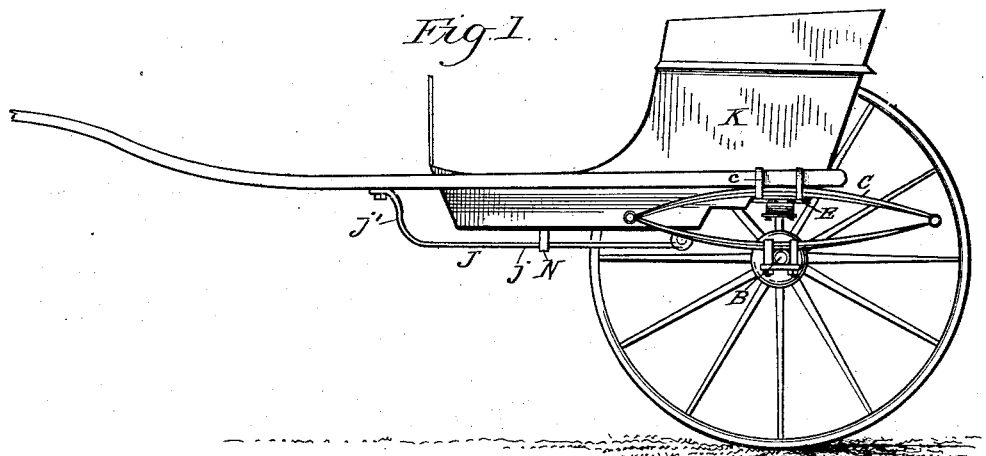
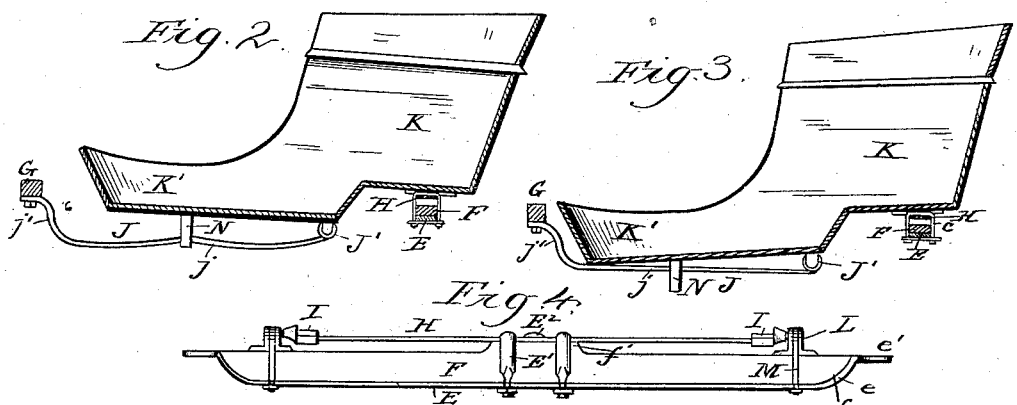
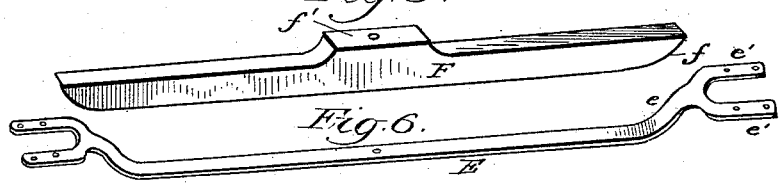
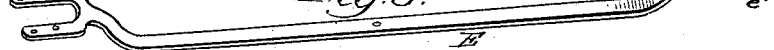
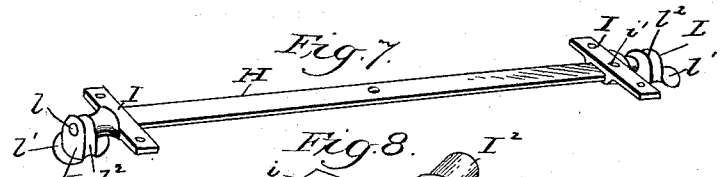
WITNESSES
J. M. Reynolds
J. S. Barker
INVENTOR
William C. Pitner.
By Doubleday Bliss
Attorney
N. PETERS, Photo-Lithographer, Washington, D. C.

UNITED STATES PATENT OFFICE.

WILLIAM C. PITNER, OF LA PORTE, INDIANA.

TWO-WHEELED VEHICLE.

SPECIFICATION forming part of Letters Patent No. 317,413, dated May 5, 1885.

Application filed February 20, 1885. (No model.)

*To all whom it may concern:*

Be it known that I, WILLIAM C. PITNER, a citizen of the United States, residing at La Porte, in the county of La Porte and State of Indiana, have invented certain new and useful improvements in Two-Wheeled Vehicles, of which the following is a specification, reference being had therein to the accompanying drawings.

Figure 1 is a side view of a two-wheeled vehicle having my improvements applied thereto, the wheels being removed. Figs. 2 and 3 are sectional views of the same, showing the body in different positions. Fig. 4 is a rear view of the body-support detached. Figs. 5, 6, 7, and 8 are detached views in perspective of the various parts forming the body-support.

In the drawings, B represents the axle, which is supported in the wheels in the usual manner. At C there is shown one of the side springs which are clipped to the axle below, and which have the shafts secured to their upper sides, as shown in Fig. 1. The shafts are joined by a cross-bar, G, and preferably extend somewhat back of the points of attachment to the side springs, C. However, these devices above described do not enter essentially into the present invention, and may be modified without departing from the spirit of my invention.

The body K of the vehicle is mounted between the shafts and between the side springs, C, it being supported in such manner as to balance, or nearly so, when the driver is in the seat. It is arranged in the following manner.

E represents a cross-bar, formed preferably from a flat bar of iron, and extending from one side spring to the other, to which springs it is secured by means of clips $c$. This bar is bent upwardly, as at $e$, near its ends, where it is forked, in order that it may be more firmly secured to the springs, the forked ends $e'$ being provided with apertures to receive the ends of the clip-bolts.

Upon the top of the cross-bar E there is placed a bar, F, preferably of wood, from one to two inches in cross-section, and having its lower edge or face beveled near its ends at $f$, in order that it shall fit or lie close to the bent portion $e$ of bar E, the relative sizes and arrangement of the bars E and F being such that the upper face of bar F is in about the same horizontal plane as the forked ends $e'$ of the bar E. The central portion, $f'$, of the bar F is raised somewhat—say about half an inch—to form a bearing for the cross torsion-spring H, which is secured thereto by means of clips E' and bolt E², which secure together the bars E and F and the spring H. The spring H, I have shown as formed of a flat straight bar of elastic material, preferably steel, it being connected at its ends to the body of the vehicle, the method of connection which I prefer to employ being hereinafter described.

I is a plate adapted to be attached to one of the side sills of the vehicle-body K, by means of bolts passing through apertures $i$ in the ends of the plates, there being two or more of these apertures near each end to allow it to be adjusted upon the sills of the body as circumstances may require. This plate is provided upon its under side with a socket, I', in which is seated the end of spring H, it being secured therein by means of a screw or bolt, $i'$, passing through a counter-sunk aperture, $i^2$, in the plate I, and into the spring. It will of course be understood that one of these plates is employed upon each side of the vehicle-body. I² is a stud or trunnion projecting from the outer edge or face of the plate I, and adapted to enter an eye, $l$, of a perforated lug, L, secured to the body-support near its ends. This lug is provided with a base-plate, $l'$, adapted to rest upon the upper face of the bar F, and has formed in its upper face and sides a groove, $l^2$, in which lies a clip, M, securing the lug to the bars E and F.

From the above description and an examination of the drawings it will be seen that whenever the shafts are elevated or depressed from any cause, as by the motion of the horse, the draft devices carry with them the body-support E F, which rocks beneath the body, and this being permitted by the pivotal connection formed by the stud $i^2$, working in the perforated lug L, and the elasticity of the spring H, which latter is twisted between its central part and its ends, where it is connected with the body of the vehicle. For instance, when the front ends of the shafts swing up, the draft-devices carry with them the body-support, which rocks beneath the body, and as both the body and the draft-devices are connected rigidly with the spring H, but flexibly or pivotally with each other, the spring yields at its center, and therefore the body is prevented from being thrown up, although the permanent connection between the parts is not broken. The reverse of this happens when the front ends of the shafts go down, as will be understood. By means of devices of this character the body is held in proper horizontal position regardless of the oscillations or vibrations imparted to the shafts by the horse.

By employing the plate I and the lug L, I provide a pivotal connection between the body and its support upon substantially the line of balance of the vehicle-body, which connection allows them to rock freely relatively to each other, sustains the weight of the body, thus relieving the torsional spring from all vertical strain and allowing it to freely perform its work of preventing any oscillation of the body-support from being communicated to the body, and also insures that the body shall be held and supported should the spring H, from any cause, become broken.

The "body-support" upon which the body rests, and which can rock relatively thereto as about an axis, is shown as consisting of the bars E and F, together with the side springs, the axle, and the shafts; but as these parts may be variously modified without departing from the spirit of my invention, I do not wish to be limited to the specific forms shown. The pivots which are interposed between the body and its supports, consisting of lugs L and plates I provided with studs, form a positive and permanent though loose connection between the body and the bars E F, retaining the body in place upon its support while allowing it the necessary freedom of movement. This connection differs from that shown in another patent granted to me, wherein the body rests directly upon the rounded upper surface of the body-support, my present construction lessening the danger of breaking the torsional spring, and operating under some conditions in a more satisfactory manner.

In order that the above devices shall operate satisfactorily, it is necessary that a flexible connection between the cross-bar G or the shafts and the body should be employed, and I have shown a spring-connection for that purpose, which I now deem the most advantageous.

J is a flat or leaf spring situated centrally under the foot-rest or forward part, $k'$, of the vehicle-body. In order that this forward portion of the body may lie sufficiently low between the shafts, I bend the spring near its forward end so that its main part $j$ shall lie below the shafts. The short vertical portion $j'$ of the spring is bolted or secured to the cross-bar G in front of the body, while the longer horizontal part $j$ extends rearwardly under the body to a point a little in front of the natural balance of the body, where it is attached by a shackle-joint, J'. By this arrangement the up-and-down motion of the cross-bar or the shafts is entirely lost before reaching the body, partly in the flexible spring J and partly in the shackle-joint J'. The shackle-connection J' also relieves the spring J from the forward and backward shocks and strains which would be imparted to it by the motions of the body were it not for such a flexible connection, the shackle-joint allowing a limited movement of the body relatively to the spring, or vice versa, which movements might result disastrously to the spring were its connections both to the body and cross-bar rigid, and which would materially increase the "horse-motion," which it is one of the objects of this invention to avoid. A further advantage incident to placing the flexible shackle-connection at a point under substantially the central part of the body is that the body is allowed to tip into the positions shown in Figs. 2 and 3 without the spring being at the same time and thereby correspondingly bent upward or downward, as is the case in those vehicles employing a single front spring rigidly connected at the rear end to the under side of the body and flexibly connected to the cross-bar of the shafts, my construction allowing the front spring, J, at all times to remain substantially horizontal, and permitting the front part or toe of the body, when depressed, to rest upon this spring, for a purpose to be described.

M is a safety or tension strap attached to the under side of the body and encircling the spring F between its ends. It prevents any sudden motion, which would tend to throw the body backward, from breaking or dangerously straining the spring J by holding the forward end to place, as shown in Fig. 3.

In Fig. 2 I have shown the position occupied by the body when a person is stepping into or out of the vehicle. This causes the body to rock around its pivotal connection with the body-support, thus throwing its forward end downward and causing it to rest upon and be supported by the yielding spring F between the cross-bar G and the point of attaching the spring to the body.

I prefer to attach the strap I as described, for, as will be seen from an examination of Figs. 2 and 3, whether the forward end of the body be depressed or elevated, there is always a spring interposed between it and the shaft, which arrangement I find preferable to one wherein the tension or safety strap connects the body directly to the shafts or cross-bar G.

I do not wish to be limited to using the spring J in connection with the torsional spring above described, as either one may be employed independently of the other, together with springs of a different character, and still operate advantageously; but I prefer to use them in the relation shown. Nor do I wish to be limited to connecting the spring H to the body by means of a socket in plate I, as this spring may be provided at its ends with outwardly-extending arms adapted to be attached directly to the under surface of the body in substantially the manner shown in my Patent No. 307,329, granted October 28, 1884.

By interposing the pivotal connection between the body and its support I am enabled to attach the torsional spring directly to the upper surface of the cross-bar connecting the side springs, thus permitting the use of a torsional spring of the most simple construction and of the least cost.

It will be seen that the connection between the spring H and the body is situated upon the line of pivotal connection between the body and its support, which is also substantially the lines of balance of the body.

What I claim is—

1. In a two-wheeled vehicle, the combination of the body, the body-support, a pivot which positively, though loosely, connects the body with the body-support, and a torsion spring which tends to resist the rocking of the body around its line of balance, substantially as set forth.

2. In a two-wheeled vehicle, the combination of the body, the body-support, a pivot which positively, though loosely, connects the body with the body-support, and a torsion-spring mounted upon the top of the body-support, and connected at its ends with the body and adapted to resist the rocking of the body around its support, substantially as set forth.

3. In a two-wheeled vehicle, the combination of the body, the body-support, a pivot which positively, though loosely, connects the body with the body-support, and is situated upon the line of balance of the vehicle body, and a torsion-spring adapted to resist the rocking of the body relative to its support, and secured at its center to the body-support and at its ends to the body upon its line of balance, substantially as set forth.

4. In a two-wheeled vehicle, the combination of the body, the body-support, lugs L supported upon the body-support, and plates carried by the body and provided with studs working in said lugs to form a pivotal support for the body, and a torsion spring between the body and its support, substantially as set forth.

5. In a two-wheeled vehicle, the combination of the body, the body-support, lugs L supported upon the body-support, plates carried by the body and provided with studs working in said lugs to form a pivotal support for the body, and a torsion-spring connected at its center to the body support and at its ends to the plates carried by the body, substantially as set forth.

6. In a two-wheeled vehicle, the combination of the body, the body-support, lugs L supported upon the body-support, plates I carried by the body and provided with studs $I^2$ working in said lugs to form a pivotal support for the body, and also provided upon their lower faces with sockets I', and a torsion-spring secured at its center to the body-support and having its ends seated in the sockets I', substantially as set forth.

7. In a two-wheeled vehicle, the combination of the axle, the side springs, the shafts, the body mounted between the shafts and below them, the flat or leaf spring J, attached at its front end to cross-bar G and at its rear end to the under side of the body, at a point considerably in rear of its front edge, by means of a shackle joint or connection, J', said spring consisting of the substantially vertical part $j'$ in front of the body, and above the lower edge thereof, and the substantially horizontal part $j$ lying under the body, whereby the body may tip without bending the spring, and the front edge of the body, when depressed, rest upon the spring, as set forth.

8. In a two-wheeled vehicle, the combination, with the body and the springs which support it upon the axle, of the flat or leaf spring J, rigidly secured to the cross-bar at its forward end and at its rear end to the body by means of a shackle, and a tension or safety strap carried by the body and encircling the spring J, substantially as set forth.

In testimony whereof I affix my signature in presence of two witnesses.

WILLIAM C. PITNER.

Witnesses:
T. W. BUTTERWORTH,
WM. F. GRAF.